United States Patent
Gentric et al.

(10) Patent No.: US 8,327,406 B2
(45) Date of Patent: Dec. 4, 2012

(54) METHOD AND SERVER FOR DOWNLOADING A BROADCASTED MULTIMEDIA CONTENT OVER A DISTRIBUTION NETWORK

(75) Inventors: Philippe Gentric, Fourqueux (FR); Nicolas Delahaye, Courbevoie (FR); Lotfi Lamrani, Levallois-Perret (FR)

(73) Assignee: NXP B.V., Eindhoven (NL)

( * ) Notice: Subject to any disclaimer, the term of this patent is extended or adjusted under 35 U.S.C. 154(b) by 1442 days.

(21) Appl. No.: 10/562,535

(22) PCT Filed: Jun. 23, 2004

(86) PCT No.: PCT/IB2004/002141
§ 371 (c)(1),
(2), (4) Date: Dec. 28, 2005

(87) PCT Pub. No.: WO2005/004434
PCT Pub. Date: Jan. 13, 2005

(65) Prior Publication Data
US 2006/0156351 A1  Jul. 13, 2006

(30) Foreign Application Priority Data
Jul. 4, 2003 (EP) .................................. 03300050

(51) Int. Cl.
*H04N 7/173* (2011.01)
*H04N 7/16* (2011.01)
*G06F 15/173* (2006.01)
*G06F 15/16* (2006.01)

(52) U.S. Cl. ............ 725/87; 725/91; 725/103; 725/114; 725/138; 725/144; 709/226; 709/227; 709/245

(58) Field of Classification Search .................... 725/87, 725/91, 98, 103, 112, 114, 118, 138, 144, 725/148; 709/226–227, 245
See application file for complete search history.

(56) References Cited

U.S. PATENT DOCUMENTS

| | | | |
|---|---|---|---|
| 5,168,356 A | 12/1992 | Acampora et al. | |
| 5,222,219 A * | 6/1993 | Stumpf et al. | 710/105 |
| 5,793,971 A * | 8/1998 | Fujita et al. | 725/101 |
| 5,864,870 A | 1/1999 | Guck | |
| 6,397,251 B1 | 5/2002 | Graf | |
| 2002/0038354 A1 | 3/2002 | Ogasawara | |
| 2002/0107759 A1* | 8/2002 | An | 705/26 |
| 2003/0236864 A1* | 12/2003 | Lai | 709/219 |

FOREIGN PATENT DOCUMENTS

| | | |
|---|---|---|
| CN | 1065568 A | 10/1992 |
| CN | 1399447 A | 2/2003 |
| WO | 01/98920 A1 | 12/2001 |
| WO | WO0249343 A1 | 6/2002 |

OTHER PUBLICATIONS

Written Opinion of the International Searching Authority for appln. No. PCT/IB2004/002141 (Oct. 2004).
Mathias Johanson, An RTP to HTTP Video Gateway, WWW10, May 1-5, 2001, Hong Kong.

* cited by examiner

*Primary Examiner* — Kristine Kincaid
*Assistant Examiner* — Gigi L Dubasky

(57) ABSTRACT

The invention applies to the transmission of a multimedia content from a server to a client terminal. The multimedia content is available from the server as one or more sets of files. Upon reception of an initial request from the client, the server sends a document back to the client, said document causing the client to repetitively send fetching request. Upon reception of a fetching request, the server selects the file to download.

9 Claims, 3 Drawing Sheets

METHOD AND SERVER FOR DOWNLOADING A BROADCASTED MULTIMEDIA CONTENT OVER A DISTRIBUTION NETWORK

FIELD OF THE INVENTION

The present invention relates to a method for downloading a multimedia content to a client device.

The invention also relates to a computer program comprising instructions for implementing such a method when executed by a processor.

The invention also relates to a server and a network system specifically designed for downloading a multimedia content to a client device.

The invention has interesting applications for the transmission of multimedia contents (including live contents like live events or broadcasted TV programs) to client devices via the Internet. It also applies to the transmission of video from one mobile device to one or more peer devices via the Internet.

BACKGROUND OF THE INVENTION

The international patent application WO02/49343 describes a method for transmitting to a terminal audio or video material that is stored on a remote server as a set of files representing successive temporal portions of said material.

In the described method, the terminal is responsible for determining which file it wants to receive and requesting each file one by one.

This solutions has two main drawbacks: first, the terminal must be specifically designed for implementing the proposed distribution method, and second the server doesn't have any control of which file is downloaded.

One of the objects of the present invention is to propose an alternative distribution method that doesn't have the above mentioned problems.

SUMMARY OF THE INVENTION

This is achieved with a server as defined in claims 1 to 4, a downloading method as defined in claims 5 to 8 and a network system as defined in claim 9.

According to the invention, upon reception of an initial request directed to a multimedia content from a client device, the server sends a document back to the client device. This document causes the client device to repetitively send fetching requests. Upon reception of the fetching requests, the server selects which file is to be downloaded.

The fetching requests of the invention don't indicate any specific file to be downloaded. They are just a request for the next file.

One advantage of having the client device send a fetching request for each file to be downloaded is that this way of operating is supported by all client browsers (some browsers may not support receiving several files in response to one single request and therefore it is preferred not to have the server send the files one by one upon reception on a single request by the client device).

With the invention, the client device is caused to send the fetching request by the document received from the server. This means that the client device doesn't have to be specifically designed to send the fetching requests. Any standard client device can implement the invention.

The invention proposes to generate one or more set of files for the same multimedia content, with slicing positions that vary from one set to another (the files are starting at different positions in time in each set). When a client sends an initial request directed to a live content, he receives either the previous file—which means he will receive out of date information—or he has to wait for the next file to be ready. In both cases, using several sets of files allows reducing the inconvenience for the user. The number of sets is a compromise between the inconvenience experienced by the client and the storage unit space needed to store the files.

File-based contents are transmitted from a server to a client device via a point-to-point connection. On IP networks, point-to-point connections are usually ruled by the HTTP protocol (Hyper Text Transfer Protocol, defined in the RFC2616 of the IETF). HTTP is a stateless protocol and therefore HTTP requests issued by the same client device are normally processed independently one from the other.

The embodiment of claims 2 and 6 allows the server to keep track of each client. As the server knows which file is to be sent next for each client, smooth playback of the content may be achieved, even when several sets of files are available.

The embodiment defined in claims 4 and 8 has advantage of allowing the client device to request jumps in the sequence of files in any fetching request.

BRIEF DESCRIPTION OF THE FIGURES

These and other aspects of the invention are further described by reference to the following drawings.

DESCRIPTION OF PREFERRED EMBODIMENT

Figure 1:
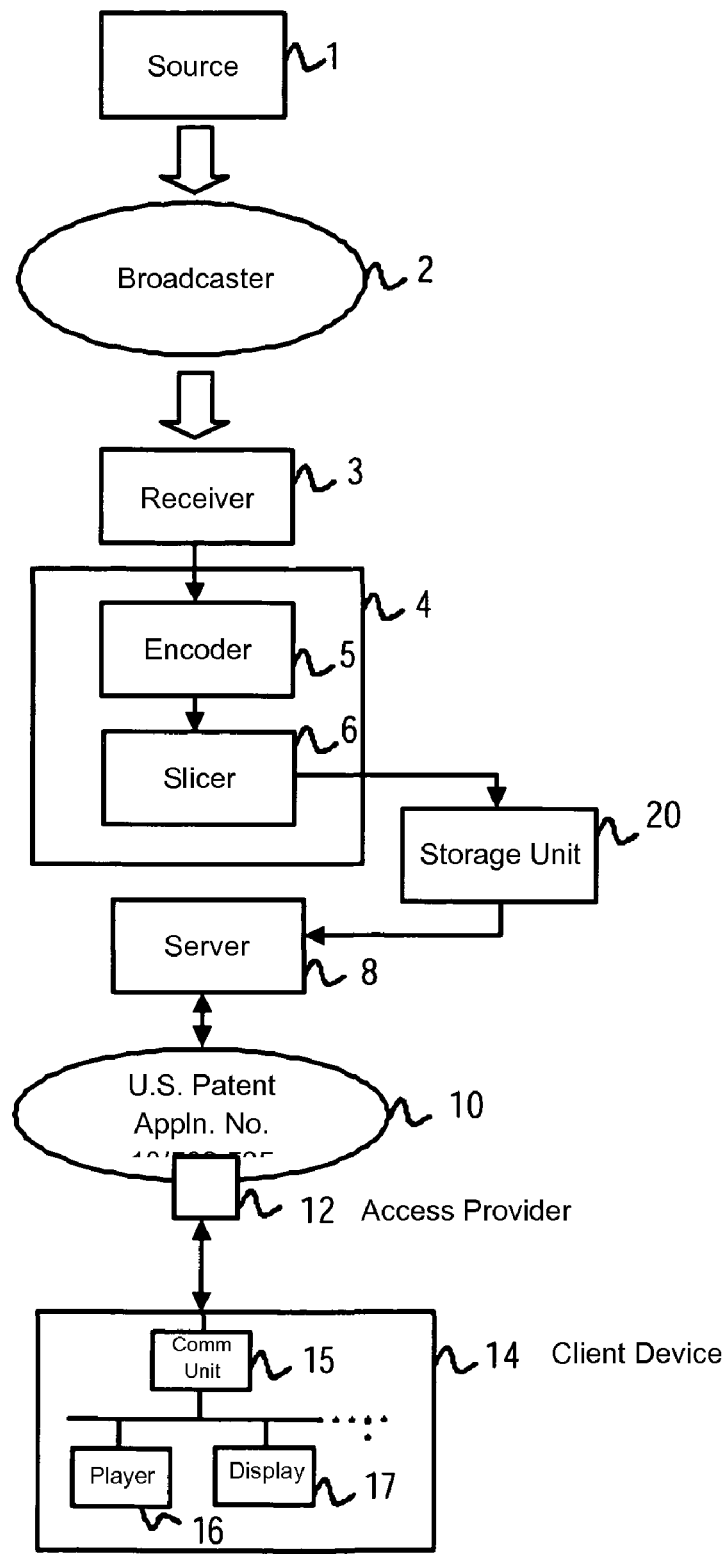
FIG. 1 is a schematic representation of a first example of network system according to the invention.

FIG. 1 is a schematic representation of a network system according to the invention. The network system of FIG. 1 comprises:

a source 1 for acquiring a multimedia content;
a broadcaster 2 for broadcasting said multimedia content;
a receiver 3 for receiving a broadcasted multimedia content;
an encoding system 4 comprising an encoder 5 for encoding a received multimedia content, and a slicer 6 for slicing an encoded multimedia content in at least one set of slicing positions forming at least one set of slices that can be decoded independently one from the other, and for enclosing each slice in a file thereby generating at least one set of files,
a server 8 having access to said files,
a distribution network 10, the server 8 being linked to the distribution network 10,
an access provider 12 for providing a client device 14 with an access to the distribution network 10.

The client device 14 has (amongst other means not represented in FIG. 1) a communication unit 15 for transmission/reception to/from the access provider 12, a player 16 for playing an encoded multimedia content, and a display 17 for displaying a multimedia content. The client device 14 can be either a mobile device (like a mobile phone) in which case the communication unit 15 is a radio communication unit, or a wired device (like a PC) in which case the communication unit 15 is a wired communication unit. The distribution network 10 is typically the Internet network.

For instance the broadcaster 2 is a satellite broadcasting network and the receiver 3 is a satellite receiver. This is not restrictive: any other broadcasting means could be used instead of satellite broadcasting means. The broadcasted multimedia content can be any multimedia content that is transmitted and can be received by a number of receivers including the receiver 3. For instance the broadcasted multimedia content can be a television program, a pre-recorded event/program, a live event . . .

The encoder 5 is responsible for encoding the received multimedia content. For instance the encoder 5 is compliant with one of the MPEG standards, or with H263.

The encoder 5 and the slicer 6 are either implemented in a single device or in two separated devices. In both cases, what is transmitted from the encoder 5 to the slicer 6 is an encoded video stream. Advantageously this encoded video stream is transmitted from the encoder 5 to the slicer 6 over IP by using the RTP protocol. This is not restrictive. By way of example, the transport layer of the MPEG-2 standard, known as MPEG-2 TS, could be used as well.

In practice, the files generated by the slicer 6 are stored in a storage unit 20 to which the server 8 has access. The storage unit 20 is shared by the slicer 6 and the server 8. The storage unit 20 can be part of the server equipment or can be located remotely.

The function of the slicer 6 is to slice the encoded content generated by the encoder 5 into a plurality of slices where each slice comprises a given amount of time of the encoded multimedia content and can be decoded independently from the other slices. In practice, any encoded multimedia content generated by a multimedia encoder comprises so-called Random Access Points (RAP). In order to produce slices that can be decoded independently one from the others, the slicer 6 slices the encoded multimedia content in such a way that each slice starts with a Random Access Point. For instance, when the encoder is compliant with the MPEG-2 or MPEG-4 standard, the random access points are the I-frames of the MPEG-encoded multimedia content, and the slicing positions are chosen in such a way that the first frame of each slice is an I-frame.

Because the slices can be decoded independently one from the other, the client doesn't need to receive the content from its beginning. It can start receiving the content from any slice. Therefore the invention is applicable to the transmission of live content, that is content that is made available at the server side in real-time (for example a live event like a championship or a show, or broadcasted program . . . ).

Advantageously the size of the slices is adjustable. It may be identical for all slices or it may vary from one slice to another (for instance the size of the slices may increase along time). The best efficiency is obtained with files that are relatively long because the more files to be transported the more overhead due to file headers.

Each slice generated by the slicer 6 is stored as a file in the storage unit 20. The storage unit 20 has to be "cleaned" on a regular basis to ensure that there is available room for storing the newly generated files. A way of cleaning the storage unit is to re-use file names on a regular basis. An alternative way is to use different file names for each file, and to delete the aging files on a regular basis.

Figure 2:
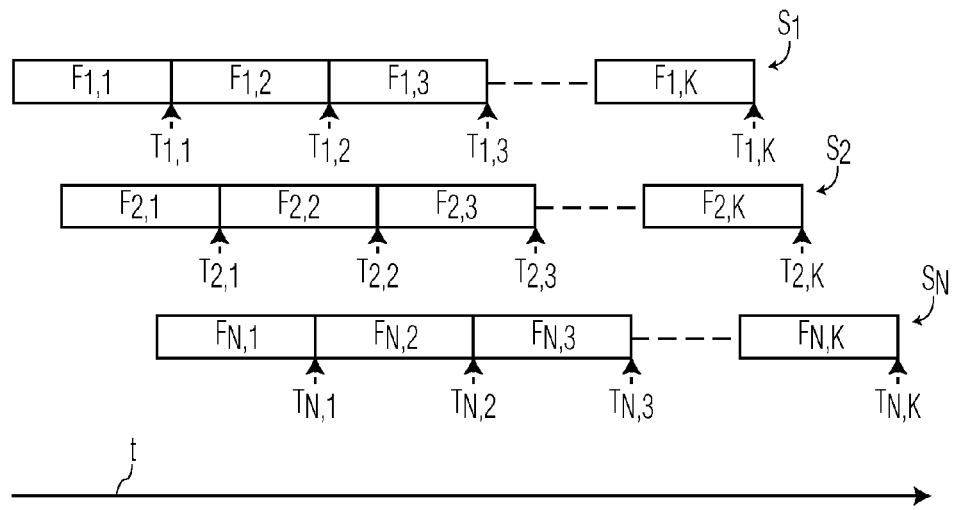
FIG. 2 is a schematic representation of a plurality of sets of files generated by a slicer according to the invention.
Figure 3:
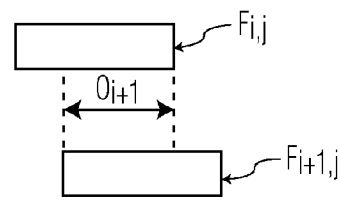
FIG. 3 is a schematic representation of two overlapping files.

According to the invention the slicer 6 generates either one set of files or a plurality of sets of files for the same multimedia content. When the slicer 6 generates a plurality of sets of files, a plurality of sets of slicing positions are used, each set of slicing positions being shifted in time compared with the other sets of slicing positions. FIG. 2 is an illustration of a plurality of sets of files $S_1, S_2, \ldots, S_N$ generated by the slicer 6. Each set of files $S_i$ comprises K files $F_{i,j}$ ($i=1, \ldots, N$; $j=1, \ldots, K$). A set of slicing positions $\{T_{i,1}, \ldots, T_{i,K}\}$ is associated to each set of files $S_i$. As illustrated in FIG. 2, the slicing positions $T_{i+1,j}$ are shifted in time compared to the slicing positions $T_{i,j}$ (the axis t is the time axis). In other words, the files $F_{i+1,j}$ and $F_{i,j}$ are overlapping (they comprise identical encoded data). In FIG. 3, the overlap between the files $F_{i+1,j}$ and $F_{i,j}$ is indicated by an arrow $O_{i+1}$.

As will be apparent in the description below generating a plurality of sets of files is advantageous because it allows reducing the delay experienced by the client when he/she sends a request for a live content.

The server 8 is linked to the distribution network 10. The client device 14 has access to the distribution network 10 via the access provider 12. Typically, the client device 14 can load through the distribution network 10 a page containing at least one link to a multimedia content that the server 8 offers to download. When a user clicks on said link, an initial request $R_0$ directed to said multimedia content is sent automatically to the server 8. There are several possible ways for the server 8 to handle the initial request $R_0$.

In a first embodiment of the invention, upon reception of the initial request $R_0$, the server 8 sends a document to the client device 14. This document causes the client device 14 to repetitively send a fetching request designating the multimedia content.

By way of example, the document sent by the server 8 can be a page comprising an automatic refresh command. An example of such a page is given below:

```
<html>
<head>
<META meta http-equiv="Refresh" content="134" ;
url='http://www.yoursite.com/live2download.html'"
</head>
<embed src="live2download.mp4" width="240" height="240">
</embed>
</html>
```

Such a page causes the client browser to reload the file "live2download.mp4" every 134 seconds (which is the duration of a file in this example).

Alternatively, the document sent by the server 8 can be a standard description of the multimedia content, said standard description being intended to be processed by the player 16 in a standard way. For instance such a description can be a SMIL description (SMIL is a W3C standard defining XML-based audio/video scene descriptions). An example of such a SMIL description is given below:

```
<smil>
<head>
<layout>
<root-layout width="240" height="240" background-color="white"/>
<region regionName="im" left="0" top="0" width="240" height="240"/>
</layout>
</head>
<body>
<seq repeatCount = "indefinite" >
<video id="vid" src="live2download.mp4" region="im" />
</seq>
</body>
</smil>
```

The effect of this SMIL document is to cause the player 16 to play the file "live2download.mp4" repetitively. As a result the client device will repetitively send fetching requests directed to the file "live2download.mp4".

Advantageously, the SMIL document sent by the server 8 comprises a command indicating that the files have to be fetched some time in advance (that is some time before the end of the playback of the previous file). This ensures that the next file will arrive on time at the client device 14 so that the client will not experience a gap in the rendering of the multimedia content. An example of a SMIL description having such a command is given below:

```
<smil>
<head>
<layout>
<root-layout width="240" height="240" background-color="white"/>
<region regionName="im" left="0" top="0" width="240" height="240"/>
</layout>
</head>
<body>
<seq repeatCount = "indefinite" >
<video id="vid" src="live2download1.mp4" region="im" clipBegin = "0s" dur = "25s" />
<par>
<prefetch src="live2download2.mp4" mediaTime ="5s" />
<video id="vid" src="live2download1.mp4" region="im" clipBegin = "25s" />
</par>
<video id="vid" src="live2download2.mp4" region="im" clipBegin = "0s" dur = "25s" />
<par>
<prefetch src="live2download1.mp4" mediaTime ="5s" />
<video id="vid" src="live2download2.mp4" region="im" clipBegin = "25s" />
</par>
</seq>
</body>
</smil>
```

This document is written for slices containing 30 s of content. It causes the player to execute the following operations in sequence:

a) playing the first 25 s of a first source (live2download1.mp4);

b) playing the last 5 s of the first source and in parallel fetching the first 5 s of a second source (live2download2.mp4);

c) playing the first 25 s of the second source (which can be done without delay since the first 5 s have been prefetched).

Using two different sources is an implementation trick. The server 8 must be designed to recognize that the first and the second sources correspond to the same encoded multimedia content.

The server has to select a file to download upon reception of the fetching requests. The server 8 can either select the most recent file or the first file to get ready. The consequence of selecting the most recent file is that the client will receive out-of-date data. The consequence of selecting the first file to get ready is that the client will have to wait a certain time before getting a response. In both case the inconvenience for the client is reduced when several sets of files are used. This is illustrated in FIG. 4.

Figure 4:
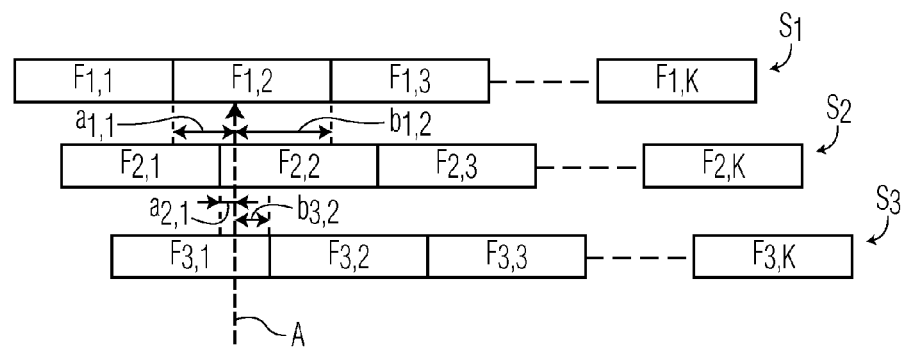
FIG. 4 is schematic representation of three sets of files.

In FIG. 4, three sets of files $S_1$, $S_2$ and $S_3$ are represented. An arrow A indicates the reception of a request by the server 8.

When the only set to be generated by the slicer 6 is the first set $S_1$, the server 8 will either download the file $F_{1,1}$ (the most recent file) or the file $F_{1,2}$ (the next file to get ready). If the server 8 downloads the file $F_{1,1}$, then the data received by the client will be late by a time equal to $a_{1,1}$. If the server downloads the file $F_{1,2}$, then the client will experience a delay equal to $b_{1,2}$ before receiving the data.

When the three sets $S_1$, $S_2$ and $S_3$ are generated by the slicer 6, the server 8 will either download the file $F_{2,1}$ (the most recent file) or the file $F_{3,2}$ (the next file to get ready). If the server 8 downloads the file $F_{2,1}$, then the data received by the client will be late by a time equal to $a_{2,1}$. If the server downloads the file $F_{3,2}$, then the client will experience a delay equal to $b_{3,2}$ before receiving the data. It can be seen that $a_{1,1} > a_{2,1}$ and $b_{1,2} > b_{3,2}$.

The transmissions over the distribution network 10 are ruled by the HTTP protocol. HTTP is a stateless protocol and therefore HTTP requests issued by the same client device are normally processed independently one from the other. As a result, there is a risk that the playback of the content cannot be achieved smoothly when several sets of files are available (some parts of the content may be received several times, or some parts of the content may be missing). A second embodiment of the invention will now be described that solves this problem.

In the second embodiment of the invention, the document sent by the server 8 in response to the initial request $R_0$ comprises a resource identifier designating the encoded multimedia content asked by the client. This resource identifier is specific to the client device 14. The document sent by the server 8 causes the client device 14 to repetitively send a fetching request containing this resource identifier. Upon reception of the first fetching request, the server 8 selects the file to be downloaded as described above (it selects either the most recent file or the next file to get ready). The server 8 downloads the selected file and keeps a record of which file was downloaded (or alternatively which file is next to be downloaded). Upon reception of subsequent fetching requests containing the same resource identifier, the server 8 checks the record to select the next file to download, downloads the selected file and updates the record.

In this way, each client device 14 will receive a sequence of files that is complete and correctly ordered (all the received files are consecutive files belonging to the same set of files).

By way of example the resource identifier comprised in the document sent by the server 8 can be a "nonce" as defined in the RFC1510 of the IETF (a nonce is a number that is used only once). An example of a SMIL document comprising such a resource identifier is given below:

```
<smil>
<head>
<layout>
<root-layout width="240" height="240" background-color="white"/>
<region regionName="im" left="0" top ="0" width="240" height="240"/>
</layout>
</head>
<body>
<seq repeatCount = "indefinite" >
<video id="vid" src="cnn142299293873635534291919.mp4" region="im" />
</seq>
</body>
</smil>
```

Here the resource identifier is cnn142299293873635534291919. The client device 14 will repetitively send fetching requests for the file cnn142299293873635534291919.mp4. The server 8 will keep track of which file was downloaded (or is to be downloaded) for the resource identifier cnn142299293873635534291919.

In a third embodiment of the invention, the fetching request sent by the client device may contain a jump indication (a backward or a forward command). For example, such a backward or forward command is input by the client by moving a cursor on a sliding bar. An indication of the position or displacement of the cursor is then included in the fetching request. It is used by the server together with the resource identifier to determine the file to download.

Figure 5:
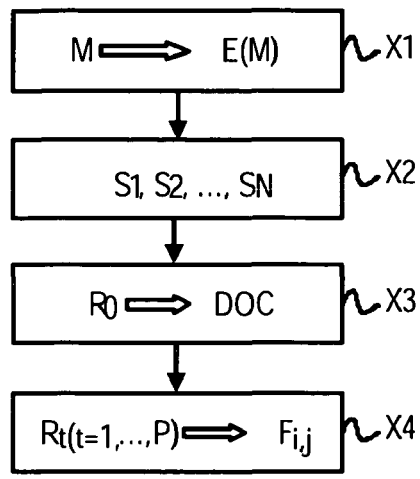
FIG. 5 is a block diagram of a method according to the invention for downloading a live multimedia content.

The steps that have been discussed above are summarized in FIG. 5. According to FIG. 5, a method according to the invention for downloading a multimedia content M comprises:
- a step X1 of producing an encoded a multimedia content E(M),
- a step X2 of slicing the encoded multimedia content E(M) in at least one set of slicing positions forming at least one set of slices that can be decoded independently one from the other, and enclosing each slice in a file $F_{ij}$ thereby generating at least one set of files $S_1, S_2, \ldots, S_N$
- a step X3 of sending a document DOC to said client device upon reception of said initial request $R_0$, said document causing said client device to repetitively send a fetching request $R_t$(t=0, ..., P with P being an integer) that designates said multimedia content,
- a step X4 of selecting at least one file $F_{ij}$ amongst said set(s) of files, upon reception of said fetching requests from said client device, and downloading the selected file(s) to the client device.

These steps are implemented by way of specific hardware and/or software comprised in one or several devices. For instance in FIG. 1, step X1 is implemented by the encoder 5, step X2 is implemented by the slicer 6, and steps X3 to X4 are implemented by the server 8.

Two other examples of a network system according to the invention will now be described by reference to FIGS. 6 and 7.

Figure 6:
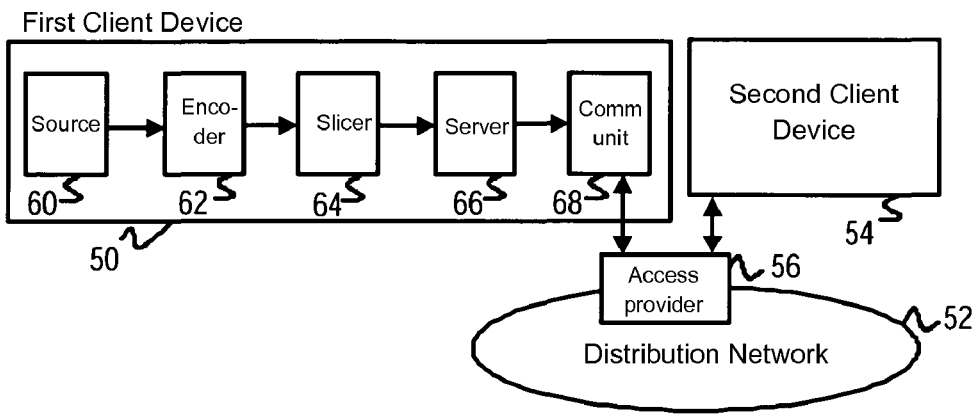
FIG. 6 and 7 are schematic representations of other examples of a network system according to the invention.

The network system of FIG. 6 comprises a first client device 50, a distribution network 52, a second client device 54, and at least one access provider 56 for providing the first and the second client devices 50 and 54 with an access to the distribution network 52.

The second client device 54 is similar to the client device 14 described by reference to FIG. 1. Typically the distribution network 52 is the Internet network.

The first client device 50 comprises:
- a source 60 for acquiring a multimedia content,
- an encoder 62 for encoding an acquired multimedia content,
- a slicer 64 for slicing an encoded multimedia content in at least one set of slicing positions forming at least one set of slices that can be decoded independently from the others, and for enclosing each slice in a file thereby generating at least one set of files,
- a server 66 having access to said files,
- a communication unit 68 for transmission/reception to/from the access provider 56.

Typically the first client device is a mobile phone, which means that the communication unit 68 is a radio communication unit.

The functionalities of the source 60, the encoder 62, the slicer 64 and the server 66 are identical to the functionalities of the source 1, the encoder 5, the slicer 6 and the server 8 described above by reference to FIGS. 1 to 4.

Figure 7:
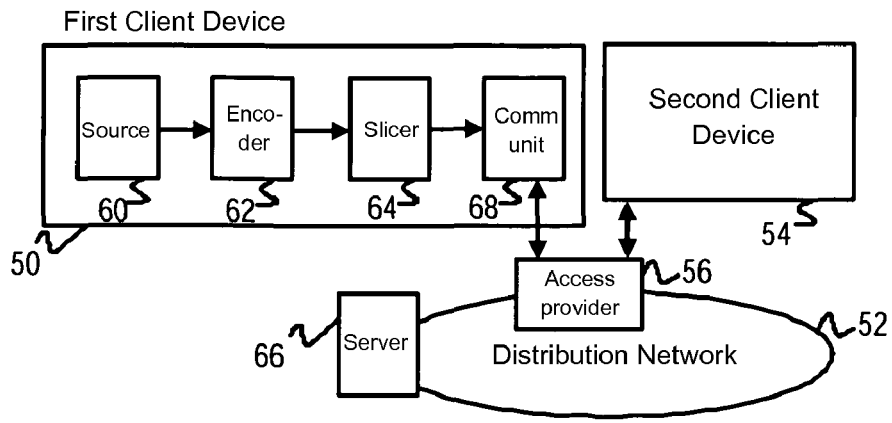

FIG. 7 gives a schematic representation of an alternative solution where the server 66 is located in the distribution network 52 instead of being located in the first client device 50. In this embodiment, the first client device 50 will upload the files generated by the slicer 64 to the server 66, and the server 66 will in turn download at least one the files to the second client device 54.

Typically the first client 50 sends a link toward an encoded multimedia content (for instance a video that is being captured by the first client device 50) to the second client device 54, for instance via SMS (Short Message Service). When the second client clicks on the link contained in the SMS, an initial request directed to the encoded multimedia content is sent to the first client device 50. Upon reception of this initial request, the first client device 50 operates as described above with reference to FIGS. 1 to 4.

Modifications or improvements may be proposed with respect to the described network system, server, system, slicer, client device, and downloading method without departing from the scope of the invention. The invention is thus not limited to the examples provided.

In particular the "progressive downloading" concept disclosed in the European patent application n° 03290453.4 filed on May 07, 2003 by Koninklijke Philips Electronics N.V. can be combined with present invention. When a file generated by the slicer 6 is progressively downloaded, the player 16 doesn't need to wait until the file is completely downloaded to start playing the file.

The use of the verb "comprise" in the description and in the claims does not exclude the presence of other elements or steps than those listed in the description and in the claims. The use of the article "an" or "a" preceding an element or step does not preclude the presence of a plurality of such element or step.

The invention claimed is:

1. A server having access to at least a first set of files ($S_1$) generated by slicing an encoded multimedia content in a first set of slicing positions ($\{T_{1,1}, \ldots, T_{1,K}\}$), and a second set of files ($S_2$) generated by slicing the encoded multimedia content in a second set of slicing positions ($\{T_{2,1}, \ldots, T_{2,K}\}$) shifted in time compared to the first set of slicing positions, forming at least two sets of slices that can be decoded independently one from the other, and enclosing each slice in a file ($F_{i,j}$), thereby generating at least a first set of files ($S_1$) and a second set of files ($S_2$), said server comprising:
- means for receiving an initial request directed to a multimedia content from a client device, the multimedia content including at least one of audio content and video content,
- means for sending a document to the client device upon reception of said initial request, said document causing the client device to repetitively send a fetching request designating said multimedia content, wherein said fetching request does not identify a specific file to be sent from the server to the client device,
- means for selecting at least one file ($F_{i,j}$) including at least one of audio content and video content amongst said sets of files ($S_i$), upon reception of said fetching requests from the client device, wherein said at least one file ($F_{i,j}$) is selected by evaluating an out-of-date time of a most recent file and a delay time of a next file to get ready, and
- means for downloading the selected file(s) ($F_{i,j}$) to the client device.

2. A server as claimed in claim 1, wherein said document contains a resource identifier designating said multimedia content and specific to the client device, and causes the client device to repetitively send fetching requests containing said resource identifier, and said server further comprises:

means, activated upon reception of a first fetching request, for selecting a first file to be downloaded amongst said sets of files ($S_i$) and for keeping a record of said resource identifier together with an indication of the selected file, and means, activated upon reception of subsequent fetching requests, for checking said record in order to select the next file to be downloaded and for updating said record.

3. A server as in claim 1, wherein said document comprises an instruction for the client device to send a subsequent fetching request before the end of the playback of the file that was downloaded in response to the previous fetching request.

4. A server as claimed in claim 2, further comprising means for selecting a file to download based on a jump indication contained in said fetching request.

5. A method for downloading an encoded multimedia content to a client device, said method comprising the steps of:
  encoding a multimedia content, the multimedia content including at least one of audio content and video content,
  slicing said encoded multimedia content in at least a first set of slicing positions ($\{T_{1,1}, \ldots, T_{1,K}\}$) and a second set of slicing positions ($\{T_{2,1}, \ldots, T_{2,K}\}$) forming at least two sets of slices that can be decoded independently one from the other,
  enclosing each slice in a file ($F_{i,j}$) thereby generating at least two sets of files ($S_i$),
  receiving an initial request from the client device, said initial request being directed to said multimedia content,
  sending a document to the client device upon reception of said initial request, said document causing the client device to repetitively send a fetching request designating said multimedia content, wherein said fetching request does not identify a specific file to be sent from the server to the client device,
  selecting at least one file ($F_{i,j}$) including at least one of audio content and video content amongst said sets of files ($S_i$), upon reception of said fetching requests from the client device, wherein said at least one file ($F_{i,j}$) is selected by evaluating an out-of-date time of a most recent file and a delay time of a next file to get ready, and downloading the selected file(s) ($F_{i,j}$) to the client device.

6. A method as claimed in claim 5, wherein said document contains a resource identifier designating said multimedia content and specific to the client device, and causes the client device to repetitively send fetching requests containing said resource identifier, said method further comprises the steps of:
  upon reception of a first fetching request, selecting a first file to be downloaded amongst said sets of files ($S_i$) and keeping a record of said resource identifier together with an indication of the selected file, and
  upon reception of subsequent fetching requests, checking said record in order to select the next file to be downloaded and updating said record.

7. A method as in claim 5, wherein said document comprises an instruction for the client device to send a subsequent fetching request before the end of the playback of the file that was downloaded in response to the previous fetching request.

8. A method as claimed in claim 6 wherein said step of selecting a file to download takes into account a jump indication contained in the received fetching request.

9. A network system comprising:
  a source for acquiring a multimedia content,
  an encoder encoding said multimedia content,
  a slicer for slicing said encoded multimedia content in at least a first set of slicing positions ($\{T_{1,1}, \ldots, T_{1,K}\}$) and a second set of slicing positions ($\{T_{2,1}, \ldots, T_{2,K}\}$) forming at least two sets of slices that can be decoded independently one from the other, and for enclosing each slice in a file ($F_{i,j}$) thereby generating at least two sets of files ($S_i$),
  a distribution network,
  an access provider for providing a client device with an access to said distribution network, and
  a server as in claim 1.

* * * * *